United States Patent [19]

Cassels

[11] Patent Number: 4,695,085
[45] Date of Patent: Sep. 22, 1987

[54] SHEET CARRIER

[76] Inventor: Mark A. Cassels, 637 Fernandina St., Palm Bay, Fla. 32907

[21] Appl. No.: 926,121

[22] Filed: Nov. 3, 1986

[51] Int. Cl.$^4$ .............................................. B65G 7/12
[52] U.S. Cl. ...................................... 294/15; 294/26; 294/169
[58] Field of Search .................. 294/15, 17, 19.1, 26, 294/27.1, 32, 137, 141, 142, 167, 169; 248/324, 339, 341, 351, 354.6, 470, 471

[56] References Cited

U.S. PATENT DOCUMENTS

| 2,367,627 | 1/1945 | Sterrett | 294/15 |
| 2,428,941 | 10/1947 | Packard | 294/26 X |
| 2,739,007 | 3/1956 | Rauterberg | 294/15 |
| 2,930,583 | 3/1960 | Noe et al. | 294/15 X |
| 3,203,606 | 8/1965 | Masterson | 294/137 |
| 4,113,160 | 9/1978 | Spiers | 294/26 X |
| 4,630,838 | 12/1986 | Stockton | 294/15 X |

FOREIGN PATENT DOCUMENTS 1064438 10/1979 Canada .................. 294/15

Primary Examiner—Johnny D. Cherry
Attorney, Agent, or Firm—Roger L. Martin

[57] ABSTRACT

A hand held sheet carrier for use with plywood and wallboard sheets has a pair of rigid plate components that are pivotally interconnected. One plate component has an upright working position, a foot portion on which a sheet being carried is supported and a channel for receiving the lower edge of a sheet being carried on the carrier. The second plate component is pivotally moveable between a retracted position and an extended position and has a handle. It also has a foot provider which is offset from the foot portion of the one plate component when the second plate component is in the retracted position and which serves with the foot portion to retain the one plate component in its upright position on a supporting surface for the carrier. The arrangement facilitates the loading of the carrier with a sheet to be carried by the carrier. Provision is also made for a locking device for locking the plate components in the retracted position. This device has a manipulatable screw element that is mounted on one plate component and an internally threaded element that is mounted on the other component and which is adapted to receive the screw element when the components are pivoted to the retracted position.

3 Claims, 5 Drawing Figures

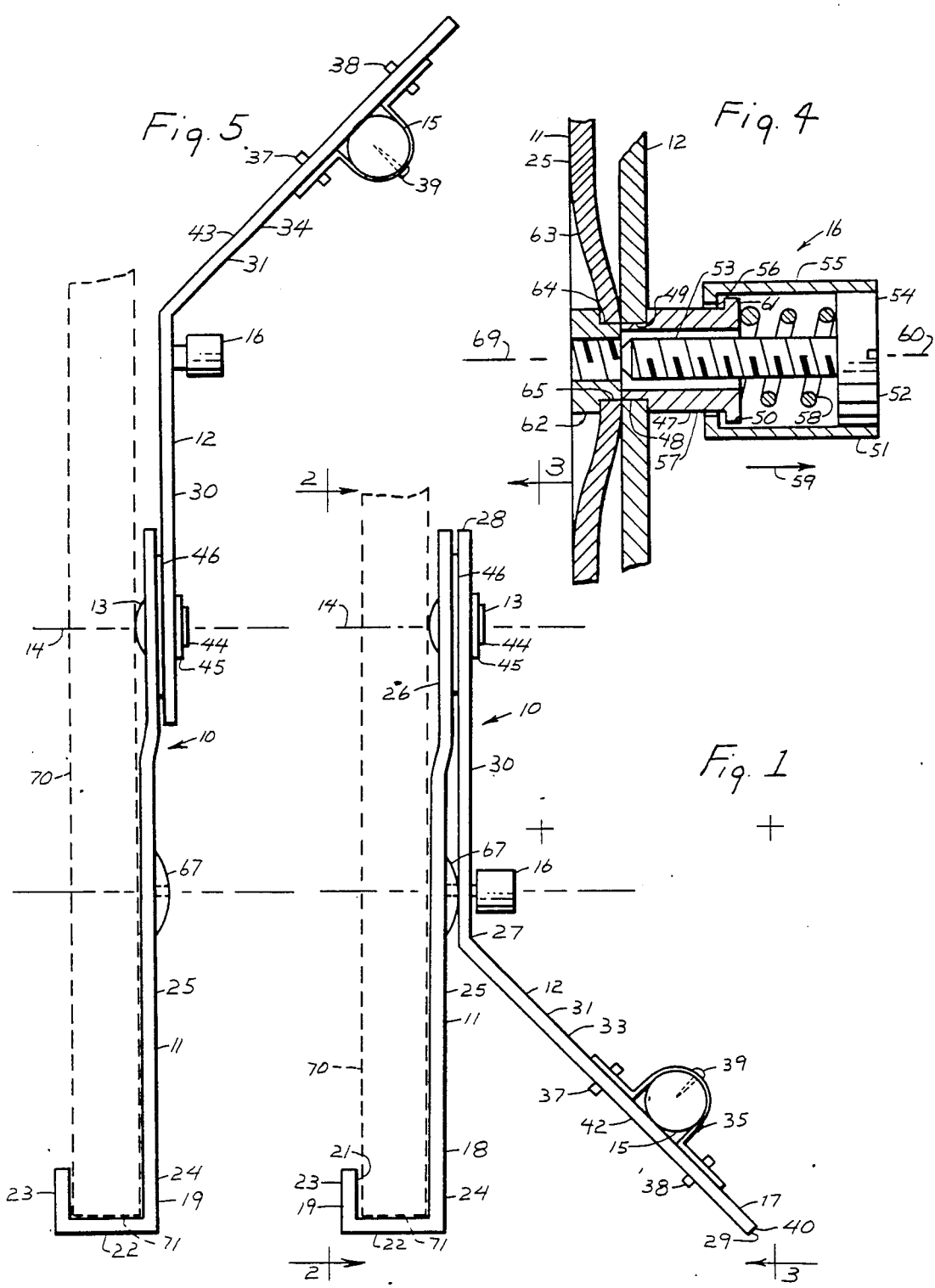

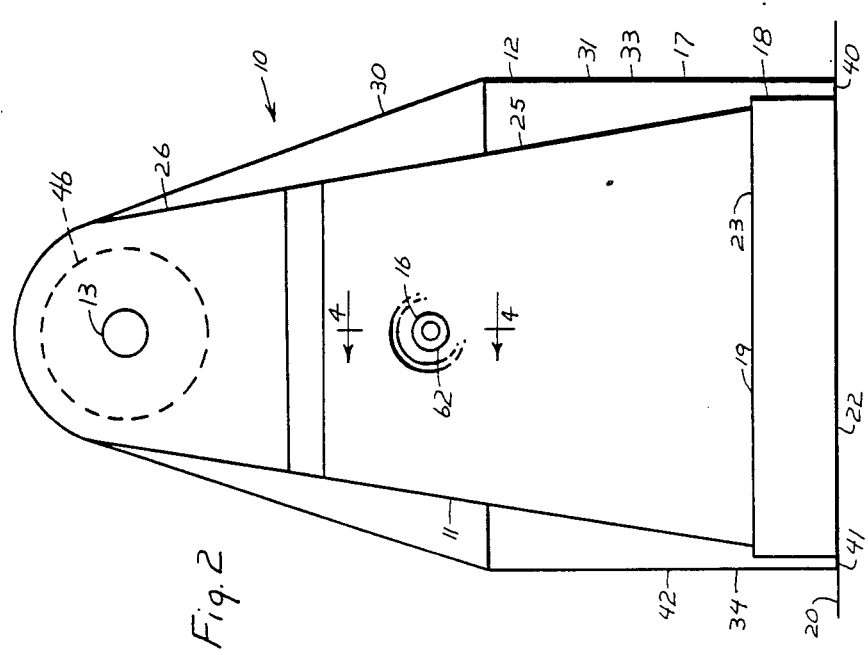
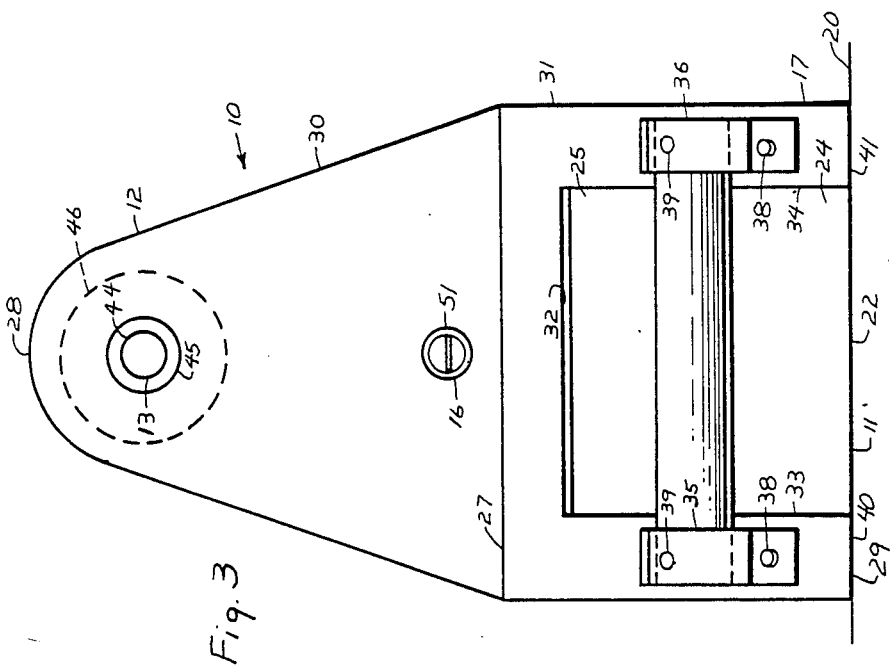

SHEET CARRIER

BACKGROUND OF THE INVENTION

This invention relates to sheet carriers that are normally hand held and used, for example, at a construction job site, for carrying sheets of plywood, wallboard and the like sheet material from one place to another.

Those familiar with modern residential and commercial structures are aware of the wide use of sheets of plywood and wallboard in the design and construction of such structures. Such sheets of materials as received from the supplier are usually stored at one location at the job site. Thereafter, as the needs arise at the job site, the sheets are distributed to the various points at which they are contemplated for use or embodiment in the structure.

This distribution of the sheet material is usually done by a worker who, alone or with the aid of another worker, simply carries the sheets, usually one at a time, from the storage location to the various points of contemplated use or embodiment in the structure. The sheets are frequently heavy, and are commonly large (usually 4'×8'), thus making it difficult and awkward for a worker to grasp and, without aid, manipulate and carry over and about the many obstructions that exist at a construction job site. As such, most of such sheet distribution is performed by workers that work in pairs and who cooperate in lifting and carrying each sheet to its point of ultimate use at the job site.

Several devices have been proposed for use as hand held sheet carriers for use by a single worker and without the aid of another worker for carrying such sheets about a job site area. In general, such devices suffer from one or more disadvantages that have detracted from their gaining wide acceptance in the market place.

In many cases, the devices are only capable of being used satisfactorily to handle and carry the sheets under optimum conditions, such as those encountered when the terrain being traversed is horizontal and unobstructed, such devices being otherwise incapable of performing satisfactorily, for example, when the need arises to traverse a stairway or other inclined pathway. In general, devices which are only satisfactorily used in unobstructed level areas cause damage to the sheets if used to carry the sheets on inclined pathways, or otherwise require more effort to overcome the problems encountered during use on such inclined pathways than is required to simply handle the sheets by hand.

Apart from the above, most of the known sheet carriers are so constructed that it is difficult for a worker to position the sheet on the carrier in preparation for its being lifted and carried about at the job site by the worker without first having to lift the sheet with one hand and simultaneously orient the carrier with reference to the bottom edge of the sheet by means of the other hand. This is a task requiring considerable effort as will be apparent to those encountering such tasks, and not infrequently the sheets are damaged during the preparatory procedure.

Most of the proposed devices have a sheet support portion or member which is adapted to straddle the lower edge of the sheet and a handle which is usually integrally joined thereto or so designed as to be fixed with respect to the support member during use of the carrier. The sheet support member of the carrier is normally oriented along the center line of gravity for the sheet when the sheet is being carried on a horizontal surface, and the handle of such devices under such circumstances is located above the sheet support member. Provisions are usually made in the design of such carrier devices to hold the handle apart from the sheet so as to avoid an abrasive action on the hand knuckles during use.

Such devices as are provided with a handle that is either integrally joined or otherwise fixed relative to the sheet support member suffer from the disadvantage that they are difficult to use in carrying the sheets on inclined passageways such as on inclined ramps and stairways. In such cases, there is a need to carry the usually eight foot long sheet at a substantial angle to the horizontal as the worker traverses the stairway or ramp. This causes both the handle and center line of gravity to shift rearwardly relative to the support member when the sheet is tilted during an ascent of a stairway or forwardly when the sheet is tilted during a descent of a stairway. Since the lifting forces which support the sheet and carrier are applied vertically through the handle, there is a moment of horizontal force under such circumstances which tends to counteract the tilting movement of the handle and which, as such, tends to disrupt the seating arrangement between the support member of the carrier and the lower edge of the sheet. As a result, there is a tendency either for the sheet to slide on the support member so that extreme effort is required to retain the sheet in place, or for the support member to tilt relative to the edge of the sheet and thereby dig in and damage the sheet along its lower edge, all of which is unsatisfactory and detracts from the wide use of such devices. To prevent such sliding or tilting movement while traversing a stairway requires considerable effort and strength on the part of a worker, and, as such, there is a reluctance to use such devices where traversal of an inclined path must be undertaken. Typical devices of this type are shown in the following U.S. Pat. Nos. 4,098,442 (Moore), 4,113,160 (Spiers), 4,177,911 (Griffin) and 4,190,278 (Jancik, Jr.).

Still other devices for use as sheet carriers have overcome this sheet sliding and damage problem by providing a simple pivotal connection between the sheet support member and the handle structure. This enables the sheet support member to pivot relative to the handle as the sheet is tilted to facilitate ascending or descending an incline and avoids the application of a horizontal moment of force to the sheet support member of the carrier device for reasons of a horizontal shift in location of the handle of the carrier. A typical device utilizing the pivotal concept is shown in U.S. Pat. No. 2,428,941 (Packard).

SUMMARY OF THE INVENTION

In accord with certain aspects of the invention, a hand held sheet carrier has a pair of rigid components that are pivotally interconnected so that one component is pivotally moveable relative to the other. One component is provided with a foot portion that serves as a support for a sheet being carried on the carrier. The one component has a channel for receiving the lower edge of the sheet, and the second component is equipped with a handle to facilitate grasping of the carrier by a worker. The component connecting pivot is offset from the foot portion of the one component, and the second component is provided with means which is also offset from the pivot and, at one pivotal position for the second component, serves through contact with an underlying carrier support surface to cooperate with the foot portion of the one component in supporting the carrier on the underlying surface. The one component has a working position at which the channel is arranged in an upwardly opening horizontal position and, as thus supported on the underlying surface, the component is retained in its working position so that the channel is arranged for receiving the lower edge of a sheet contemplated for transport on the carrier.

In accord with other aspects of the invention the carrier is provided with a locking device for releasably locking the components against relative pivotal movement. In its preferred form the device comprises an externally threaded element that is mounted on the handle bearing component and an internally threaded element with an opening which is mounted on the one component and becomes aligned with the externally threaded element when the two components are at the one pivotal position mentioned above. When thus aligned the externally threaded element is screwed into the opening of the internally threaded element to secure the components against relative pivotal movement. The locking device is preferably equipped with a compression spring that is also mounted on the handle bearing component and thereat arranged to urge the externally threaded element toward a disengaged position with respect to the internally threaded element.

A general object of the invention is to provide improved sheet carriers for such sheet materials as plywood, wallboard and the like. Still a further object is to provide improved sheet carriers of the kind contemplated and which enable the worker using the carrier to effectively carry such sheets on inclined surfaces without the need for exerting extreme effort in order to retain the sheet on the carrier. Yet another objective is to provide improvements in sheet carriers that make it easier and more convenient for the worker to orient the carrier relative to the sheet prior to lifting the sheet through use of the carrier. Still another objective is to lessen the damage to sheets that are carried by hand held sheet carriers and which occur during the initial process of bringing the carrier into contact with the sheet to be transported. Yet a further objective is to provide an improved hand held sheet carrier which is capable of being placed on an underlying surface and in a position permitting the worker to use both hands in lifting and positioning a large sheet of the kind contemplated on the carrier, and which is furthermore convenient and safe for the worker to use in transporting such sheets over both level and inclined surfaces.

Other aspects and objectives of the invention will become evident from a consideration of the description which follows in this specification.

BRIEF DESCRIPTION OF THE DRAWINGS

The novel features which are believed to be characteristic of this inventio are set forth with particularity in the appended claims. The invention, itself, however, both as to its organization and method of operation, together with further objects, aspects and advantages thereof, may best be understood by reference to the following description taken in connection with the accompanying drawings, wherein:

FIG. 1 is a side elevational view of a sheet carrier embodying the principles of the invention, the carrier being shown as supported upright on an underlying support surface, and a sheet of wallboard being depicted therein in broken lines;

FIG. 2 is a front elevational view of the sheet carrier shown in FIG. 1 as seen along the lines 2—2 therein, the sheet of wallboard being omitted from the view, however;

FIG. 3 is a rear elevational view of the sheet carrier shown in FIG. 1 as seen along the lines 3—3 therein, the sheet of wall board also being omitted from the view;

FIG. 4 is an enlarged section view of a locking device embodied in the carrier seen in FIGS. 1-3 and as seen along the lines 4—4 of FIG. 2; and FIG. 5 is another side elevational view of the carrier seen in FIG. 1 but under circumstances where the handle bearing component of the carrier has been pivotally moved to an extended position which is 180° from its retracted position shown in FIGS. 1-3.

DESCRIPTION OF THE PREFERRED EMBODIMENT(S)

Reference is now made to the drawings and wherein a sheet carrier embodying the principles of the invention is designated at 10. The carrier 10 is fabricated from a pair of rigid metal plates 11 and 12 that are appropriately bent, as indicated hereinafter, and pivotally interconnected by means of a pivot element designated at 13. As thus connected, each plate is rotatable with respect to the other plate about a pivot axis 14 which is established by the pivot element 13.

In addition to the plate components 11 and 12 and the pivot element 13, the carrier is provided with a handle component 15 for grasping by a worker in using the device 10. A locking device 16 is also provided in the carrier 10 for locking the plate components 11 and 12 against relative pivotal movements with respect to each other.

The carrier 10 has an upright ground supported position 17 seen in FIGS. 1—3. When thus supported, the first plate component 11 of the carrier 10 assumes an upright working position 18 that is best shown in FIGS. 1 and 2.

The bottom end portion 19 of the first plate component 11 serves as a foot portion through which the plate component 11 contacts and rests on the underlying support surface 20 when the carrier is in its upright ground supported position 17. As bent, the bottom end portion 19 defines an elongated U-shaped channel 21 which opens upwardly and is horizontally arranged when the carrier is in its ground supported position 17. Thus, the bottom end portion 19 of plate component 11 is bent to provide an elongated flat ledge 22 and a joining upright oriented narrow flange 23. The ledge 22 forms the bottom of the channel 21 and rests on the support surface 20 when the carrier is in the ground supported position 17. The flange 23, on the other hand, is offset and spaced apart from the inside wall 24 of the end portion and therewith forms the opposite sides of the channel 21.

The inside wall 24 of the bottom end portion is an integral extension of the flat planar medial portion 25 of the first plate component 11. The flat planar upper end portion 26 of the plate component 11 is parallel to the plane of the flat planar medial portion 25 but offset therefrom to fascilitate pivotal movement of the second rigid plate 12 in the light of the arrangement of the components of the locking device 16, as will be subsequently seen.

The second rigid plate component 12 of the carrier 10, as seen in FIG. 1 and 3, is bent along a horizontal line 27 that is generally located intermediate its upper and lower ends 28 and 29. This provides a flat planar upper portion 30 which is vertically oriented when the carrier 10 is located in its upright ground supported position 17. It also provides a flat planar lower portion 31 which is integrally joined along line 27 to the upper portion 30 at an obtuse angle that permits, among other things, the handle component 15 to be mounted at a point which remains offset from any sheet supported on the foot portion of the first component 11 regardless of the relative pivotal positions of the plate components.

The lower portion 31 of plate component 12 has a rectangular cutout 32 that is best seen in FIG. 3. This provides a pair of inclined legs 33 and 34 which are spaced apart in the structure of the second plate component 12. The handle component 15 is a cylindrical element which spans the space between the legs 33 and 34 and which is fixed at its opposite ends to the legs by means of a pair of metal hangers 35 and 36. Each of these hangers is fixed to a leg by means of a pair of fasteners which are designated at 37 and 38 and to the adjacent end of the cylindrical wooden handle element by yet another fastener, designated at 39. As mounted on the legs, the elongated handle component is oriented in parallel with the channel 21 when the second component 12 is in the retracted position 42.

The legs 33 and 34 provide a pair of feet 40 and 41 which are spaced apart in the structure of the second plate component 12. These feet 40 and 41 provide a means which in the structure of the carrier is horizontally offset from the foot portion of the first plate component 11 when the second plate component 12 is in the retracted or first pivotal position 42 with respect to the first plate component 11, as is evidend in FIGS. 1-3. As such, when the second plate component 12 is in the retracted position 42, the foot portion 19 of the first component 11 and the foot means provided by the feet 40 and 41 of legs 33 and 34 are adapted and arranged to support the carrier in the ground supported position 17 through contact with the underlying surface 20. When this happens the first plate component 11 is retained in its upright working position 18 and the channel 21, in turn, is retained in an upwardly opening horizontal arrangement for receiving the lower edge of a sheet to be carried on the carrier 10, as will be evident hereinafter.

The pivot element 13 extends through appropriately aligned holes (not shown) in the flat upper end portion 26 of plate component 11 and in the upper portion 30 of plate component 12. Between the plate components 11 and 12, the carrier 10 is provided with a narrow bent washer 46 of spring steel to provide a frictional bearing surface during pivotal movement of the plate components 11 and 12. In pivotally connecting the plate components of the carrier, the shank of the pivot element 13 is cold formed to provide an integral end retainer 44 for a washer 45 that is received on the shank of the element 13 before the retainer is formed to again serve as a bearing surface during pivotal movement of the plate components.

The locking device 16 is used for locking the second plate component against pivotal movement with respect to the first plate component and is best seen in FIG. 4. It includes an open ended hollow cylindrical mounting element 47 with a cylindrical inner end portion 48 of reduced diameter that is press fit into a hole 49 in the upper portion 30 of plate component 12. The outer end of the mounting element 47 is adapted to provide an outwardly and radially projecting annular flange 50 that serves to retain a manipulatable means component 51 of the device 16 on the mounting element 47 when the component 51 is not in use.

The manipulatable component 51 is mounted on and carried by the plate component 12 and includes a screw element 52 with an externally threaded shank 53 and a cylindrical head 54. It also includes a hollow cylindrical sleeve element 55 that surrounds and is coaxial with the screw element 52 of the manipulatable component 51. The sleeve element 55 is press fit at its outer end onto the exterior cylindrical surface of the screw head 54. At its inner end the sleeve element 55 is equipped with an inwardly radially projecting annular flange 56 that loosely surrounds the body 57 of the mounting element 47 between the inner end portion 48 and the annular flange 50 of the mounting element 47 so that the sleeve element 55 is movable back and forth along the axis 60 of the mounting element. Surrounding the shank 53 of the screw element 52 between the outer end extremity 61 of the mounting element 47 and the cylindrical head 54 of the screw element 52 is a coiled compression spring 58. The shank 53 of the screw element 52 is coaxially arranged in the cylindrical hollow portion of the mounting element 47. As carried on the second component 12, the spring 58 serves to constantly urge the manipulatable component 51 in the direction of arrow 59 and into a position at which the sleeve flange 56 bears against the flange 50 of the mounting element 47.

Mounted on and carried by the first plate component 11 is an open ended internally threaded hollow cylindrical element 62 of the locking device 16. The medial portion 25 of plate component 11 has a depression or concavity 63 at the front face of the plate component 11 and the element 62 is located and mounted in the depression 63 so as to avoid interference with and damage to any sheet that bears against the medial portion 25 of the plate component 11 when being carried on the carrier 10.

The hollow element 62 has an inner end portion 64 of reduced diameter and this end portion 64 is press fit into a hole 65 in the plate component 11. The hole 65 and element 62 share a common axis 69 which is aligned with the common axis 60 for the mounting element 47 and the hole 49 in plate component 12 when the latter component 12 is at its retracted pivotal position 42 with respect to plate component 11. Under such circumstances the externally threaded shaft or shank 53 of screw element 52 is in axial working alignment with the threaded hollow or opening of element 62, and component 51 may be manipulated to threadedly engage the shank 53 of the screw element 52 in the threaded opening of the element 62 so as to releasably secure the plate components 11 and 12 against pivotal movements relative to each other. It should be evident that the components of the locking device 16 which are mounted on plate 12 may be mounted on plate 11 if the component of the device 16 which is mounted on plate 11 is, in turn, mounted on plate 12.

It should be pointed out that in the formation of the concavity 63 on the front side of the plate component 11, a bulge or protuberance 67 is formed at the back side of the plate component 11. Because of this protuberance 67, the flat planar upper end portion 26 of plate component 11 is offset backwardly from the plane of the medial portion 25 to provide clearance during the pivotal movements of the respective components.

It is believed obvious that plate components 11 and 12 will be oriented and used by the worker depending primarily upon the sheet transporting job involved. Where the job primarily involves transportion of sheets of wallboard from one place to another over level ground at a job site, the plate components 11 and 12 will be pivotally moved until the plate component 12 is in the retracted position 42. Under such circumstance, the axes 60 and 69 will become aligned and component 51 may be manipulated to screw the threaded element 52 of the locking device 16 into element 62 thereof. This will secure the rigid plate components 11 and 12 against pivotal movements with respect to each other.

With the plate components 11 and 12 thus secured against pivotal movements, the carrier may then be placed in its ground supported position 17 at the pick-up point for transporting the sheets. In this position 17 as seen in FIG. 1, the channel 21 of plate component 11 is horizontally arranged and opens upwardly. As such, the worker may use both hands to lift a sheet of wallboard from a pile thereof and place it on the carrier 10 so that the lower edge 71 of the sheet 70 rests on the ledge 22 of the foot portion forming lower end portion 19 of the component 11. In doing this, the worker will, of course, so orient the sheet that the center line of gravity for the sheet passes through the ledge 22 so that the weight of the sheet 70 is reasonably well balanced on the carrier.

Once the sheet has been oriented on the carrier, the worker maintains the upright orientation of the sheet 70 on the carrier 10 with one hand and, with his body positioned at the handle side of the carrier 10, bends to grasp the handle 15 with the other hand and lifts the sheet 70 from the ground by means of the carrier 10. When the carrier 10 is thus used to lift and transport a sheet 70, the sheet will normally be carried at the side of the worker providing the hand for grasping the carrier handle 15 and the other hand will normally be used to steady and maintain the load balanced on the carrier 10.

Where the job calls for transportation of wallboard sheets up a stairway, it is unnecessary to lock the plate components 11 and 12 against relative pivotal movements and the method of carrying the sheets is different than described above. First of all at the pick-up point, the plate components 11 and 12 are pivoted to bring the component 12 into its retracted position 42. With the plates thus oriented with respect to each other, the carrier 10 is supported on the ground in its ground supported position 17 and the sheet 70 is placed with its lower edge 71 on the ledge 22 of the end portion 19 and with the center line of gravity extending generally through the ledge.

Thereafter, the worker simply swings the plate component 12 into its extended position 43 (FIG. 5) and at which the component 12 is pivotally rotated 180° from its position at 42 (FIG. 1-3). The washer 46 between the plates 11 and 12 is made of spring steel and is bent to provide a frictional bearing surface between the plates and which by friction retains the plate component 12 at the extended position 43 under the influence of normal gravitational forces. As such, once the handle component 15 has been pivoted to the extended position 43, the worker, while maintaining the sheet 70 in an upright position on the carrier walks to the side of the sheet opposite the handle 15 and reaches downwardly to grasp the handle 15 and thereby lifts the sheet 70 by means of the carrier 10. Under such circumstances, the sheet 70 becomes oriented between the worker's body and the hand bearing arm used in grasping the handle 15 and the worker steadies the load through use of the other hand. As the sheet is being transported on the carrier 10, the longitudinal axis of the sheet is oriented in the direction of movement of the worker. When the stairway is encountered, the sheet is pivoted about the axis 14 of pivotal movement for the plates so that ledge 22 generally assumes a position parallel to the angle of inclination. This can be done by simply elevating the front portion of the sheet as it is being carried up the inclined pathway and so that the longitudinal axis of the sheet remains parallel with the incline. This is all realatively easy to accomplish because of the pivotal nature of the supporting component of the carrier.

Other methods of utilizing the carrier will become evident to those skilled in the art. While only a certain preferred embodiment of the invention has been shown and described by way of illustration, many modifications will occur to those skilled in the art and it is, therefore, desired that it be understood that it is intended herein to cover all such modifications as fall within the true spirit and scope of this invention.

What is claimed as new and what is desired to secure by Letters Patent of the United States is:

1. A hand held sheet carrier for use with plywood, wallboard and the like sheet material comprising: a first rigid component that has an upright working position, and a foot portion for supporting a sheet to be carried on the carrier, said foot portion having means defining a channel that is upwardly opening and horizontally arranged at said working position for receiving the lower edge of a sheet to be supported thereby, a second rigid component, a handle mounted on said second rigid component for grasping by a user of the carrier, and pivot means interconnecting the first and second components and establishing a pivot axis offset from said foot portion for pivotal movement of said second component with respect to said first component, said second component having a first pivotal position with respect to said first component, and foot means which is horizontally offset from the foot portion of said first component when said second component is at said first pivotal position, said foot means and said foot portion being adapted and arranged when said second component is at said first pivotal position to support said carrier on an underlying support surface through contact therewith, whereby said first component is retained in said upright working position when said carrier is thus supported on said underlying support surface and said channel is retained in an upwardly opening horizontal arrangement for receiving the lower edge of a sheet to be carried on the carrier; said carrier further comprising a device for locking the second component against pivotal movement with respect to said first component, and said locking device comprising screw means mounted on one of said first and second components, and threaded means mounted on the other of said first and second components, said screw means being arranged in working alignment with said threaded means when said second component is at said first pivotal position and thereat being threadedly engageable with said threaded means.

2. A hand held sheet carrier in accord with claim 1 wherein said locking device further comprises: means carried by said one of said first and second components urging said screw means out of engagement with said threaded means.

3. A hand held sheet carrier for use with plywood, wallboard and the like sheet material comprising: a first rigid component that has an upright working position, and a foot portion for supporting a sheet to be carried on the carrier, said foot portion having means defining a channel that is upwardly opening and horizontally arranged at said working position for receiving the lower edge of a sheet to be supported thereby, a second rigid component, a handle mounted on said second rigid component for grasping by a user of the carrier, and pivot means interconnecting the first and second components and establishing a pivot axis offset from said foot portion for pivotal movement of said second component with respect to said first component, said second component having a first pivotal position with respect to said first component, and foot means which is horizontally offset from the foot portion of said first component when said second component is at said first pivotal position, said foot means and said foot portion being adapted and arranged when said second component is at said first pivotal position to support said carrier on an underlying support surface through contact therewith, whereby said first component is retained in said upright working position when said carrier is thus supported on said underlying support surface and said channel is retained is an upwardly opening horizontal arrangement for receiving the lower edge of a sheet to be carried on the carrier; said carrier further comprising a device for locking the second component against pivotal movement with respect to said first component, said locking device comprising means manipulatable at the first pivotal position of said second component to thereat releasably secure said second component against pivotal movement with respect to said first component, said handle being elongated and oriented in parallel with said channel when said second component is at said first position, and said manipulatable means being located on said second component between said handle and said pivot means.

* * * * *